(12) United States Patent
Huang et al.

(10) Patent No.: US 7,495,550 B2
(45) Date of Patent: Feb. 24, 2009

(54) METHOD AND APPARATUS FOR REAR-END COLLISION WARNING AND ACCIDENT MITIGATION

(75) Inventors: Qingfeng Huang, San Jose, CA (US); James E. Reich, San Francisco, CA (US); Patrick C. P. Cheung, Castro Valley, CA (US); Daniel L. Larner, San Jose, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 74 days.

(21) Appl. No.: 11/320,267

(22) Filed: Dec. 28, 2005

(65) Prior Publication Data

US 2007/0152803 A1 Jul. 5, 2007

(51) Int. Cl.
*B60Q 1/00* (2006.01)
(52) U.S. Cl. .................. 340/435; 340/903; 340/464
(58) Field of Classification Search ................. 340/534, 340/932.2, 464, 903, 435
See application file for complete search history.

(56) References Cited

U.S. PATENT DOCUMENTS

| | | | |
|---|---|---|---|
| 5,786,752 | A | 7/1998 | Bucalo et al. |
| 6,012,008 | A | 1/2000 | Scully |
| 6,213,512 | B1 | 4/2001 | Swann et al. |
| 6,225,896 | B1 | 5/2001 | Sendowsky |
| 6,226,389 | B1 * | 5/2001 | Lemelson et al. ........... 382/104 |
| 6,359,552 | B1 | 3/2002 | King |
| 6,405,112 | B1 * | 6/2002 | Rayner ........................ 701/35 |
| 6,571,161 | B2 | 5/2003 | Browne et al. |
| 6,609,053 | B1 * | 8/2003 | Breed .......................... 701/45 |
| 6,746,049 | B2 | 6/2004 | Pavlov et al. |
| 6,765,495 | B1 * | 7/2004 | Dunning et al. ............. 340/903 |
| 2002/0171542 | A1 * | 11/2002 | Bloomfield et al. ......... 340/464 |
| 2002/0198660 | A1 * | 12/2002 | Lutter et al. ................ 701/301 |
| 2003/0112132 | A1 * | 6/2003 | Trajkovic et al. ............ 340/435 |
| 2005/0128061 | A1 * | 6/2005 | Yanai .......................... 340/435 |
| 2005/0134440 | A1 * | 6/2005 | Breed .......................... 340/435 |
| 2005/0134441 | A1 * | 6/2005 | Somuah ...................... 340/435 |
| 2005/0237172 | A1 * | 10/2005 | Boomershine, III ......... 340/467 |
| 2006/0071764 | A1 * | 4/2006 | Lynch ......................... 340/435 |

(Continued)

*Primary Examiner*—Daniel Wu
*Assistant Examiner*—Hongmin Fan
(74) *Attorney, Agent, or Firm*—Marger Johnson & McCollom, P.C.

(57) ABSTRACT

This disclosure introduces a system which generates a visual, audio, and/or tactile warning to a driver of a lead vehicle when a possible rear-end collision is detected, based on the approach of a second vehicle from a rear direction. The system may also generate a warning signal (such as quick blinking red brake light, or an array of multi-color lights) directed to the approaching vehicle when it is determined to be approaching at an unsafe speed. The system may include one or more of: approaching-vehicle-sensors mounted on the back end of the lead vehicle, a computer processing system, a set of warning lights, a set of speakers within the lead vehicle, and an antenna and transmitter/receiver for communicating with systems of other vehicles. This system may include a connection to the existing taillight system and other existing systems in the lead vehicle. Extended systems may include connections to and control of head support system, seat-belt systems and airbags system to provide additional safety to the occupants of the lead vehicle. The system may also record and store a few seconds of sensor data of the pre-crash and crash related scene when an impact occurs, and provide blind spot warnings.

29 Claims, 6 Drawing Sheets

U.S. PATENT DOCUMENTS

2006/0091653 A1* 5/2006 De Mersseman et al. .... 280/735
2007/0040664 A1* 2/2007 Johnson et al. ............. 340/467
2007/0200322 A1* 8/2007 Sakakida ................. 280/730.1

* cited by examiner

METHOD AND APPARATUS FOR REAR-END COLLISION WARNING AND ACCIDENT MITIGATION

TECHNICAL FIELD

This disclosure generally relates to electrical communication systems, and in particular it relates to vehicle-mounted indicators or alarms concerning external conditions.

BACKGROUND OF THE DISCLOSURE

Rear-end collision is a significant category of crashes, accounting for nearly one in four of all collisions, or 1.7 million total crashes, in 1998 alone, according to U.S. Department of Transportation (DOT) statistics. Rear-end collisions result in approximately 2,000 deaths, or approximately 4.5% of all traffic related deaths, and approximately 950,000 injuries annually. Rear-end collisions are generally characterized as either "lead vehicle stationary" or "lead vehicle moving." The incidence of lead vehicle being stationary occurs at least twice as often as a moving lead vehicle.

The most prevalent existing rear-end collision prevention mechanism is a plurality of red brake lights positioned so as to face the rear direction of a lead vehicle, which activate so that the red brake lights are constantly illuminated when a driver of the lead vehicle is depressing a brake pedal of the lead vehicle. These red brake lights, when activated, help drivers following the lead vehicle to determine whether the lead vehicle is reducing speed or stopping. However, despite of the use of such red brake lights, rear-end accidents still occur.

In an attempt to prevent or minimize damage and injury caused by traffic collisions, various systems have been previously developed. U.S. Pat. No. 5,786,752 entitled "Emergency Signal System For Vehicles" describes a warning system provided on a lead vehicle having at least one light emitting signal facing rearward, a velocity measurement sensor for measuring an absolute velocity of the lead vehicle and a control unit coupled to the velocity measurement sensor for determining if the measured absolute velocity is greater than a threshold velocity. A warning is transmitted to vehicles approaching from the rear when a velocity of the lead vehicle is below the threshold velocity.

U.S. Pat. No. 6,225,896 entitled "Panic Stop, Deceleration Warning System" describes a rear-end warning system that uses a lead vehicle's standard white reverse light in addition to the red brake lights.

U.S. Pat. No. 6,359,552 entitled "Fast Braking Warning System" discloses a collision warning system that warns vehicles traveling behind a lead vehicle when the lead vehicle initiates deceleration. The disclosed system has two modes of warning operation, initiate warn and repeat warn. In the first mode, a lead vehicle initiating a sudden deceleration detects its own slowdown and transmits a warning to the rear of the vehicle. The second mode of operation does not detect deceleration of the lead vehicle, but instead receives a transmitted warning from the vehicle(s) ahead of the lead vehicle and automatically actuates the lead vehicle's red brake lights. The warning is also simultaneously retransmitting to the rear to actuate the brake lights of the next vehicle.

U.S. Pat. No. 6,012,008 entitled "Method and Apparatus for Predicting A Crash And Reacting Thereto" discloses an active sensing system for predicting a collision. The sensing is based on reflection of pulse signals (e.g., radar, laser) and measuring "time-of-flight" thereof.

U.S. Pat. No. 6,213,512 entitled "Seat Belt Tightening Apparatus" and U.S. Pat. No. 6,746,049 entitled "Adaptive Seat Belt Tensioning System" describe two systems for controlling seat belts and tension during operation of a lead vehicle.

U.S. Pat. No. 6,571,161 entitled "Pre-crash Assessment of Crash Severity for Road Vehicles" discloses a method for predicting the severity of an imminent crash of road vehicles using a sensor, a computer system coupled with pre-crash vehicle condition signal sources and a vehicle communication system onboard each of two vehicles involved in a crash. The method includes the steps of determining that a collision of the vehicles is imminent, exchanging vehicle crash-related information between the vehicles when an imminent collision is determined, computing crash-defining information onboard each vehicle and predicting onboard each vehicle the severity of the imminent collision, whereby occupant protection devices of the vehicles may be deployed in accordance with the predicted severity.

In other approaches, The Insurance Corporation of British Columbia (ICBC), through its road improvement program, has been funding road improvements in order to reduce the frequency of collisions at high crash locations in British Columbia. Several road safety engineering countermeasures specifically targeted at rear end collisions have been researched and deployed. These countermeasures include simple and affordable solutions such as signal visibility enhancements, as well as complex and expensive solutions such as intersection geometric upgrades. When appropriately used, these countermeasures have proven to be extremely cost-effective in reducing the frequency of rear end collisions. Widespread application of signal visibility enhancements is now being pursued to further decrease the risk of rear end collisions and whiplash injuries.

Most current approaches by the U.S. DOT Institute of Traffic Safety (ITS) to the rear-ending problem involve frontal collision warning systems that involve forward radar and/or vision sensors that detect the relative speed to the vehicle or object in the front and give a warning if there is a danger of collision. The ITS web site generally describes certain concepts employing a rear signal light that activates when a rear-facing sensor detects an imminent collision. The idea is to attract the following driver's attention and signal him/her that quick and forceful braking or steering is necessary to avoid a rear-end crash with the lead vehicle. Another related ITS concept, entitled "Rear Impact Collision Warning System" transmits a warning from a bus to a driver of a vehicle directly behind the bus about a potential collision.

In additional efforts, the ANN ARBOR TRANSPORTATION AUTHORITY and VERIDIAN ENGINEERING have announced significant progress in determining factors that cause rear impact collisions. They are now studying lighting options for the warning display for the back of the buses. This initiative is being coordinated with the National Highway Traffic Safety Administration's Enhanced Rear Signaling Systems project.

The existing collision warning systems focus mainly on detecting potential collision and pre-arming devices such as air-bags and seat belts. Such systems do not generally address warning a driver of a vehicle about to be impacted. Accordingly, there is a need for a method and apparatus for rear-end collision warning and accident mitigation that addresses certain limitations found in existing technologies.

SUMMARY OF THE DISCLOSURE

The present disclosure, therefore, introduces a rear-end collision warning system that notifies occupants, such as passengers and a driver of a lead vehicle, of a possible rear-end collision, in order to reduce the possibility of occurrence and mitigate the severity of such rear-end collisions. In certain embodiments, the occupants may be warned by a visual, audio and/or tactile alert. The system comprises one or more sensors mounted within the lead vehicle, such as cameras, lidar (laser-based distance sensor), radar and/or other sensors for detecting conditions to the rear and/or sides of the lead vehicle. The system may also include a computer processing system in communication with any one or more of a set of warning lights and speakers, one or more passenger safety systems, and an antenna for communicating information with other vehicles.

In various embodiments, this system can have a connection to the existing taillight system (including the existing red brake lights) of the lead vehicle for controlling signaling thereof. For example, the system may blink or flash the red brake lights so as to be visible to an approaching second vehicle, when the second vehicle is detected and determined to be approaching the lead vehicle from the rear at an unsafe speed. In additional embodiments, a lead vehicle is equipped with a separate array of multi-color, rearward-facing lights, such as arrays of red, blue and/or yellow lights, which will emit the warnings. In both instances, the rate of blinking or flashing may be changed as a determined time to collision changes, either in a predetermined manner or according to manually-entered settings.

In various additional embodiments, the rear-end collision warning system may include connections to and control of various vehicle safety devices such as head support systems, seat-belt restraint systems, and/or airbag system to provide additional safety. The system may also communicate with compatible systems on other vehicles to make more intelligent warning decisions, or to activate the braking, safety and warning systems of the approaching vehicle. The system may also persistently record a few seconds of the pre-crash and crash-related sensor data for later retrieval if an impact does occur.

BRIEF DESCRIPTION OF THE DRAWINGS

Further aspects of the present disclosure will be more readily appreciated upon review of the detailed description of its various embodiments, described below, when taken in conjunction with the accompanying drawings, of which:

FIG. 5 is a diagram illustrating exemplary rear-end collision warning systems as provided in two different vehicles, which can communicate there-between;

DETAILED DESCRIPTION OF THE SPECIFIC EMBODIMENTS

Referring now to FIGS. 1-8, wherein similar components of the present disclosure are referenced in like manner, various embodiments of a method and system for rear-end collision warning and accident mitigation will now be described in more detail.

Figure 1:
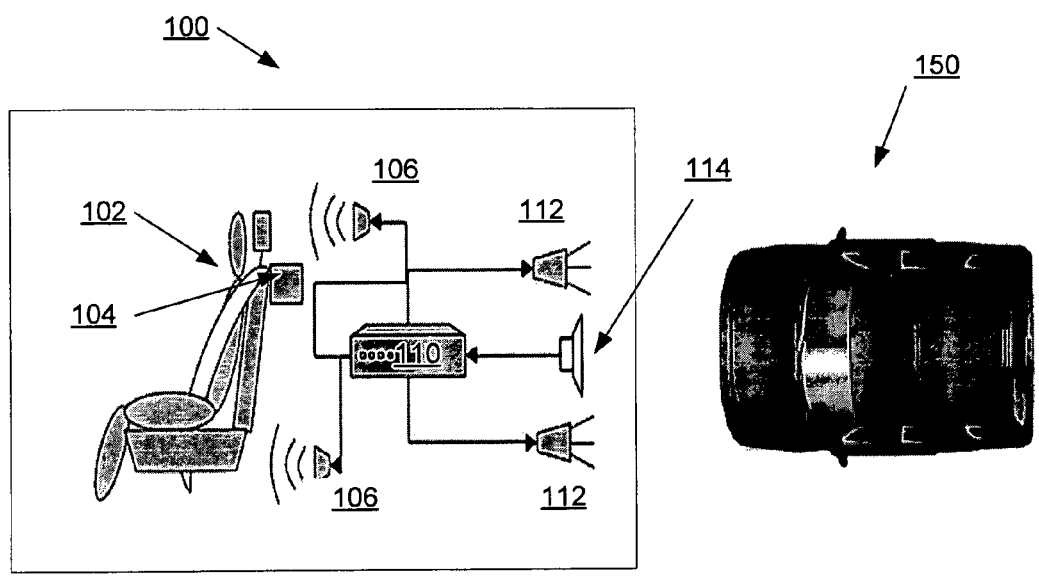
FIG. 1 is a diagram depicting a vehicle including an exemplary rear-end collision warning system according to the present disclosure.

Turning now to FIG. 1, there is depicted a representation of a lead vehicle 100, which may be any type of motorized vehicle that accommodates a driver 102 or other occupants. The lead vehicle 100 may be equipped with a passenger safety device 104, such as any one or more of a seatbelt restraint system, an airbag system, a head support system or the like, as are commonly found in existing motorized vehicles. The lead vehicle may also include one or more speakers 106, also commonly found in existing motorized vehicles.

A rear-end collision warning system conforming to the present disclosure may be installed in the lead vehicle 100, either at the time of manufacture or thereafter. In certain embodiments, the rear-end collision warning system includes a computer processing system 110 in electrical or wireless communication with one or more warning lights 112, one or more external condition sensors 114, and one or more speakers 106.

The computer processing system 110 may be any type of microprocessor-controlled system that includes electronic memory for storing processing instructions and data that may be used to perform the calculations and determinations described herein. In various embodiments, the microprocessor-controlled system may be existing systems, as are commonly found in existing motorized vehicles. In additional embodiments, the computer processing system 110 may be separately installed in the lead vehicle 100. The memory may be any type of temporary or computer-readable memory device, including those using removable media.

In various embodiments, the warning lights 112 receive signals from the computer processing system 110 to activate and warn the occupants of the lead vehicle 100 upon detection of a possible or potential rear-end collision. In some instances, the warning lights 112 may be existing lights of the lead vehicle 100, such as dashboard lights in the field of view of the driver 102 or vehicle cabin lights, as are commonly found in existing motorized vehicles. As an alternative or in addition thereto, the warning lights 112 may be separately installed in the lead vehicle 100. Such warning lights 112 may be any type of illuminating device, such as incandescent or light emitting diode (LED) systems.

In various embodiments, a separate set of warning lights 112 may receive signals from the computer processing system 110 to activate and warn a driver of an approaching second vehicle 150 upon detection by the lead vehicle 100 of a possible or potential rear-end collision. In some instances, the computer processing system 110 is connected to the existing taillight system of the lead vehicle 100, so as to activate and flash the red brake lights, or other lights thereof. Alternatively, or in addition thereto, a separate array of rear-facing lights may be installed on or in the lead vehicle 100. The separate array may include one or more monochromatic or multi-color lights. In the case of multi-color lights, such lights may include any combination of lights of various colors that can flash at varying rates and, preferably, may be addressed to flash according to various predetermined or selectable patterns. The colors may include primary colors (red, yellow blue, etc.) or any combination of the same (e.g. white). The colors may be selected from empirical and statistical information concerning colors that are more likely to attract a driver's attention.

Any of the warning lights 112 as described above may be activated so as to flash when a second vehicle 150 approaches the lead vehicle 100 from the rear direction at an unsafe speed. The rate of flashing may change as the time to collision changes, and/or may also be based on an estimated severity of the collision that ma be determined from various algorithms. For example, the rate of flashing may increase as a determined time to collision decreases or the estimated severity increases. However, any additional flashing scheme may be used, and may be determined from empirical and statistical information as to rates that are more likely to attract a driver's attention.

Any of the warning lights 112 as described above may be activated so as to present various patterns when a second vehicle 150 approaches the lead vehicle 100 from the rear direction at an unsafe speed. The patterns may change as the time to collision changes. Any type of pattern scheme may be used, such as a numerical display indicating the distance or time-to-collision. The choice of symbol may be determined from empirical and statistical information as to patterns that are more likely to attract a driver's attention.

The one or more sensors 114 of the lead vehicle 100 may be any type of sensor in communication with the computer processing system 110 to detect a second vehicle 150 that is approaching from the rear at an unsafe speed. In some instances, a sensor may be a camera, such as a video camera, that can detect visual and or infrared (IR) light radiating from an approaching vehicle. Various types of existing cameras may be used, including a traditional webcam sensor, such as the OMNIVISION OV518, or a 3-D camera sensor, such as the time-of-flight cameras from CANESTA CORP., or a real-time stereo system, such as those developed by TYZX CORP. In addition or in the alternative, the sensors 114 may be one or more of any type of external condition sensor, such as a radar detection system, a lidar detection system, or an infrared detection system for detecting approaching vehicles, an accelerometer, speedometer, or any other existing sensors of the operation of the lead vehicle 100, and may further include environmental sensors, such as temperature and road condition sensors, for detecting environmental conditions around the lead vehicle 100. Such environmental sensors may be useful for allowing the computer processing system 110 to more accurately identify a possible rear-end collision in combination with the detected speed and distance of an approaching vehicle, as described in further detail later below. All the sensors described herein are readily available in various configurations from various existing manufacturers as well as in certain existing motorized vehicles.

The speakers 106 may be existing speakers of the lead vehicle 100. Alternatively, or in addition thereto, additional speaker units of any available type may be separately installed in the lead vehicle 100 and connected to the computer processing system 110 for annunciating audible collision warnings to the occupants of the lead vehicle 100. The audible alerts transmitted may be tonal and/or spoken warnings of various types. The audible warnings may change as the time to collision changes, in any of a wide variety of manners that will be readily apparent to one of ordinary skill in the art.

The computer processing system 110 may be connected to various other devices, as described below with respect to the additional FIGS. herein.

Figure 2:
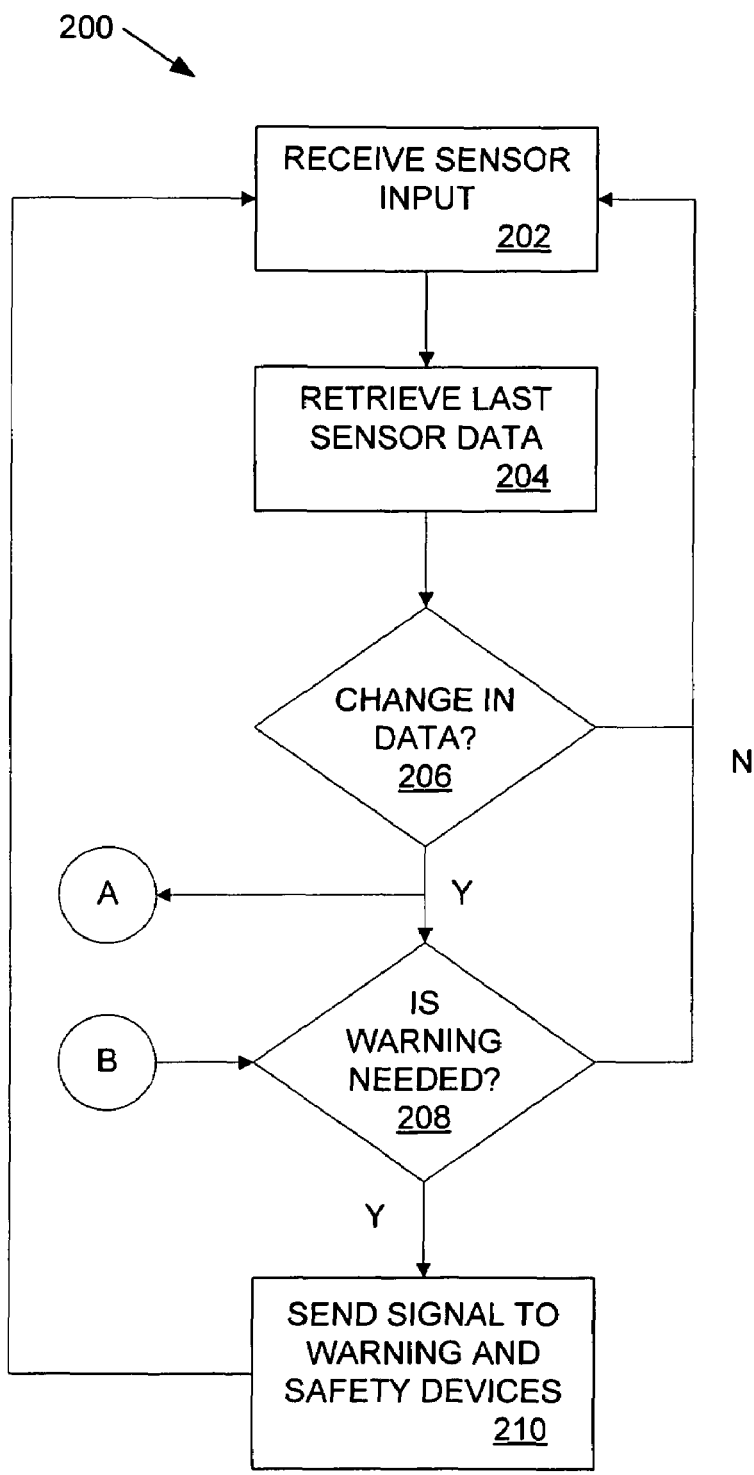
FIG. 2 is a flowchart depicting an exemplary method performed by the rear-end collision warning system of FIG. 1.

Turning now to FIG. 2, therein is depicted an exemplary process 200 performed by the computer processing system 110 for activating the warning devices (lights and/or speakers) described herein above. The process 200 may be continuously run while the vehicle is in operation, or may, in various embodiments, be activated at critical times, such as when a vehicle is slowing down or at a stop. The process 200 will be described with the embodiments where the one or more sensors 114 include a camera, however any number of alternate or additional types of sensors may be used with a suitably adapted process 200, as will be readily apparent to one of ordinary skill in the art.

The process 200 commences when a sensor 114, such as one or more cameras, transmits data, such as a visual or infrared image from a rear direction of the lead vehicle 100, to the computer processing system 110 (step 202). The computer processing system 110 stores the received data, with a time reference.

Next, at step 204, the central processing system 110 retrieves the last data received from the sensor 114. Then, at step 206, the computer processing system 110 compares the received data from step 202, with previous data received from the sensor 114 retrieved in step 204 to determine whether there is a second vehicle 150 approaching from the rear.

In the case of the use of one or more cameras, the current and previous images may be analyzed using any of a wide variety of known computer vision algorithms, stored as processing instructions within the computer processing system 110. Various computer vision algorithms that may be readily adapted by one of ordinary skill in the art for use herein may resemble those present in the OPENCV package from INTEL CORP. Using such computer vision algorithms, the computer processing system 110 can compare image data to identify a threshold change therein that indicates the presence of a second vehicle 150 to the rear of the lead vehicle 100. When there is no significant change in image data, the process 200 returns to step 202 above. However, when a vehicle is detected, the computer processing system 110 may use a rate of change in image data, and in some embodiments, take into account the aspect of the image and positioning of the cameras, to determine a distance and a velocity, or relative velocity, of the second vehicle 150. Using various well-known algorithms, a time to collision may then be readily calculated based on the determined distance of the velocity of the second vehicle 150. Such time to collision algorithms may also take into account whether the approaching vehicle 150 has sufficient braking capability to stop within the determined distance, as may be determined from sensor information of environmental conditions, programmed braking characteristics of various motorized vehicles, and/or data received from the vehicle 150, as described in more detail later below Next, at step 208, the computer processing system 110 determines whether a warning is to be provided to the driver 104 and/or the driver of the second vehicle 150, based on the time to collision calculated in step 206 above. This may be readily accomplished, for example, by establishing a threshold value, or range of values, for the time to collision that will trigger a given type of alert. The predetermined range of values that determine whether and what type of alert should be activated may be based on empirical and statistical data concerning the usefulness of various alerts in preventing such collisions. In various embodiments, the threshold values may be programmed manually by a driver, installer or manufacturer using a suitable input/output device for communicating selectable values to the computer processing system 110. The alerts may comprise an activation of the speakers 106 and/or warning lights 112, in any manner contemplated herein.

When the time to collision is not within the predetermined range of values, the process 200 returns to step 202 above. When, however, the time to collision is within the predetermined range of values, the process 200 continues to step 210, where an appropriate alert is generated for the occupants and, in various embodiments, the driver of the second vehicle 150. The predetermined ranges of time to collision may be the same for warnings device addressing the occupants of the lead vehicle and warnings for the driver of the second vehicle 150. However, in some instances, the second driver may be warned before or after the approaching driver, as may be determined necessary from the circumstances of the potential collision.

Figure 3:
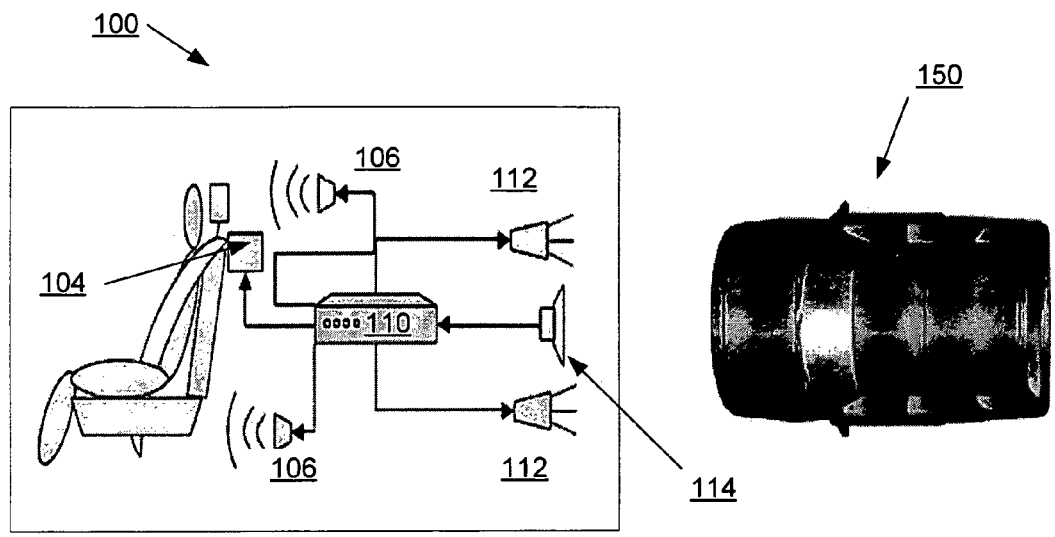
FIG. 3 is a diagram of an exemplary rear-end collision warning system that includes a connection to in-vehicle safety control devices.

In additional embodiments, the computer processing system 110 may also activate one or more other devices as described herein, such as safety devices 104 of the lead vehicle 100, as the time to collision becomes imminent. FIG. 3 shows an example in which the computer processing system 110 is operatively coupled to the safety devices 104.

Figure 4:
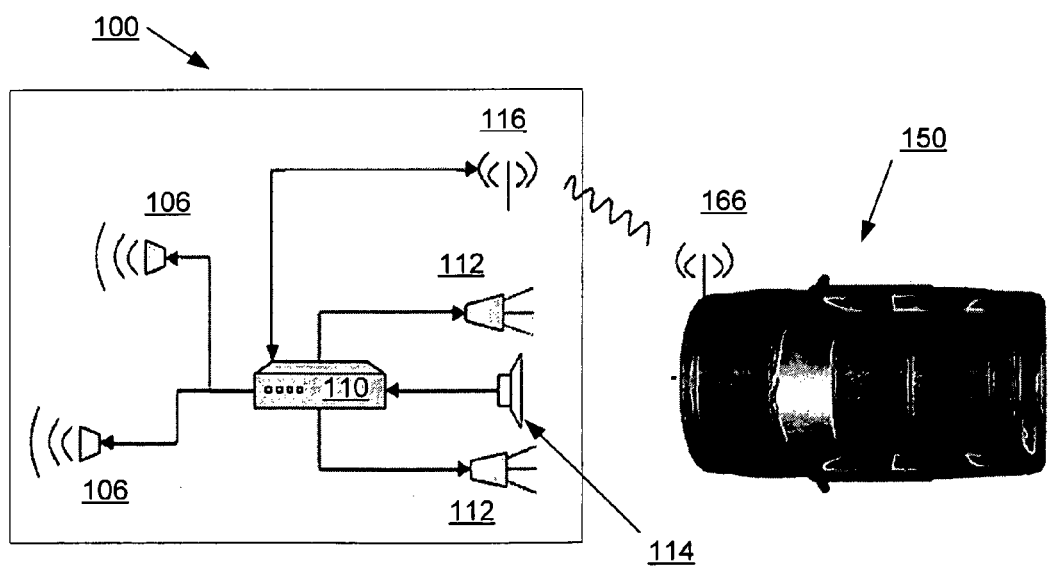
FIG. 4 is a diagram of an exemplary rear-end collision warning system that includes a wireless communication device for communicating with other vehicles.

In further embodiments, the computer processing system 110 may be in operative communication with an antenna 116, as shown in FIG. 4, and a transmitter, receiver and/or combination of the same (not shown). The computer processing system 110 may include suitable programming instructions for using the antenna to transmit information to and/or receive information from a similarly or compatibly equipped second vehicle 150 having an antenna 166 and transmitter, receiver or combination thereof (not shown). In such embodiments, the antennas 116, 166 may transmit and/or receive any one or more of RF, IR, optical or ultrasonic signals to communicate information.

Figure 5:
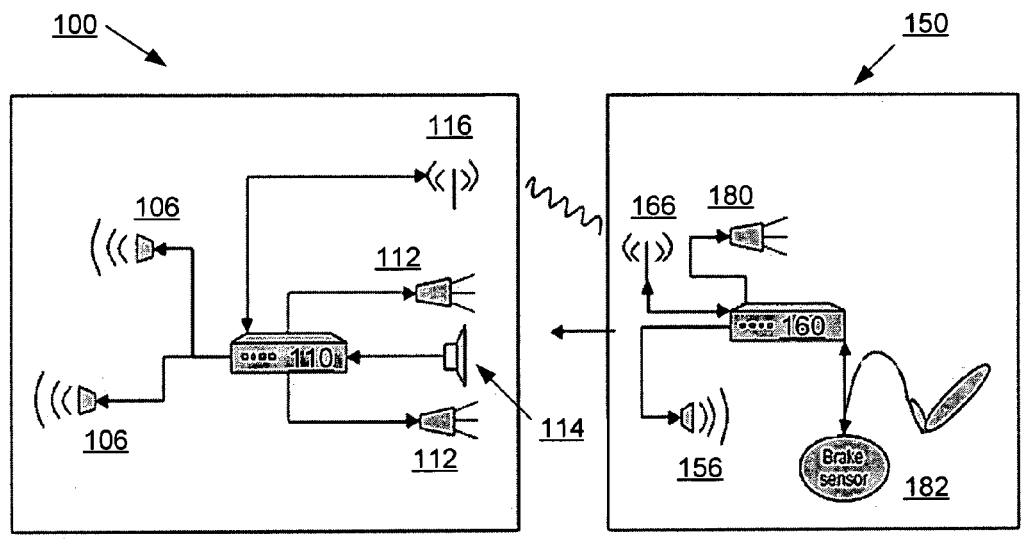

In such embodiments, the computer processing system 110 may transmit signals to the second vehicle 150 indicating a possible collision, based on the time to collision determined above and any threshold time values for triggering such an alert. A computer processing system 180 of the second vehicle 150 may respond to such signals by activating at least one of: alerting devices 156, 180 of the second vehicle 150, a braking system 182 of the second vehicle 150, and a safety device of the second vehicle 150. FIG. 5 further illustrates an example of such components in the second vehicle 150. The brake information of the second vehicle 150 can also be transmitted to the lead vehicle 100 to adjust its warning as well, and cancel them if appropriate, based on changes in the time to collision using the received data, thereby reducing incidences of false alarms.

In additional embodiments, the second vehicle 150 may also transmit its performance data, such as braking capabilities, model type, weight, current velocity and the like, which may be similarly used by the lead vehicle 100 to better identify a potential collision scenario and further reduce the false alarm rate of the disclosed collision warning system. For instance, a truck and a sports car will have different maneuvering characteristics. Their braking distances would also be different on wet or dry road surfaces. The system could modify the values in its time to collision/estimated severity algorithms to account for this data. Additionally, the model should be adjusted to account for road surface conditions, such as temperature and roughness of road surface, precipitation conditions, current lateral acceleration (curves) and wind, all of which play known roles in determining the stopping and maneuvering capabilities of a motorized vehicle. In a more sophisticated embodiment, the vehicle type may be identified using various suitable computer vision algorithms alone, without the receipt of such data from the second vehicle 150. Data on the environmental conditions and approaching vehicle can also be received by the system by accessing relevant information from the Internet or other network via a wireless connection.

Figure 6:
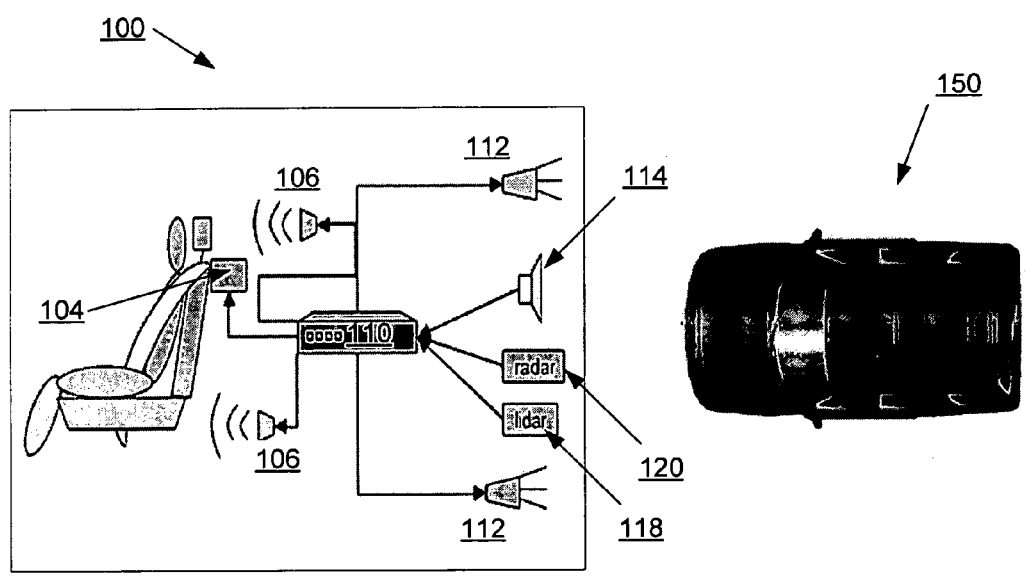
FIG. 6 is a diagram of an exemplary rear-end collision warning system that includes additional sensor devices.

FIG. 6 shows an additional embodiment of a rear-end collision warning system according to the present disclosure in which other external condition sensors, such as lidar 118 and radar 120 can be used separately or together with the camera 114 to further improve the sensing quality of the lead vehicle 100 in various scenarios. The process 200 may be modified to include the evaluation of such sensor data, which may improve the accuracy of velocity and distance from other sensors, such as cameras, or may be used when other sensor devices 114 become inoperative.

Figure 7:
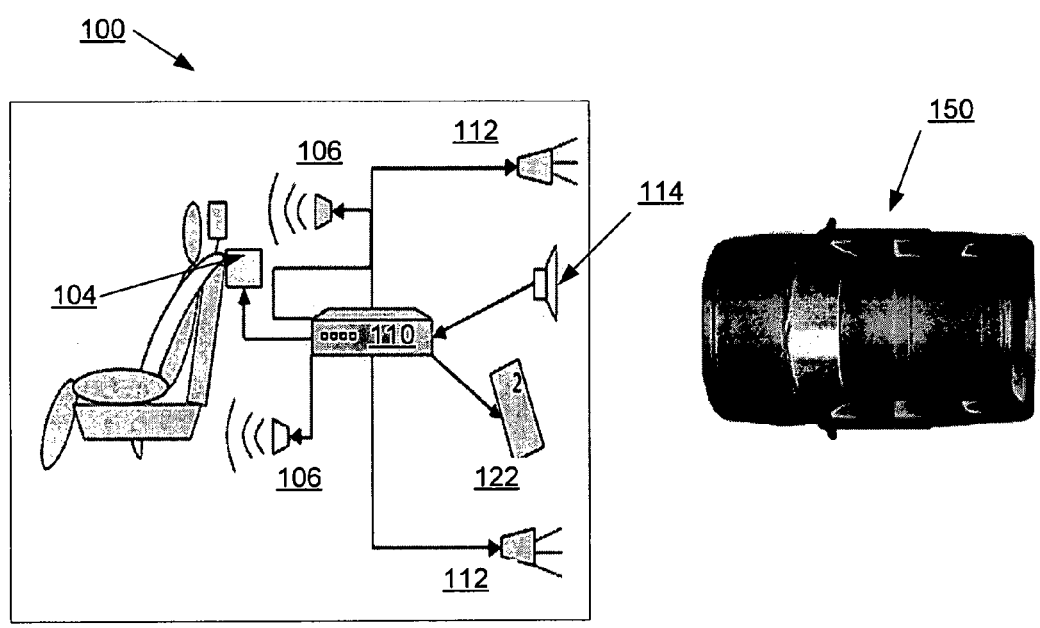
FIG. 7 is a diagram of an exemplary rear-end collision warning system that includes a messaging device positioned to message vehicles approaching from a rear direction.

FIG. 7 shows an additional embodiment of a rear-end collision warning system in which one or more additional warning devices 122 can be provided to warn the driver of the second vehicle 150. For example, the one or more warning devices 122 can include a visual digital sign 122 to display a textual warning to the second vehicle 150. It may also display collision information such as the speed/distance of the following vehicle, the estimated time to collision and estimated severity of the collision. Such information may also be displayed to the driver 102 of the lead vehicle 100, on a dashboard or other display. In the case where the warning devices 122 comprise an array of lights, the angle of the array may be adjusted based on detected or received information for the second vehicle 150, as well as the speed and distance of the second vehicle 150, in order to stay viewable to the driver of the second vehicle 150.

Figure 8:
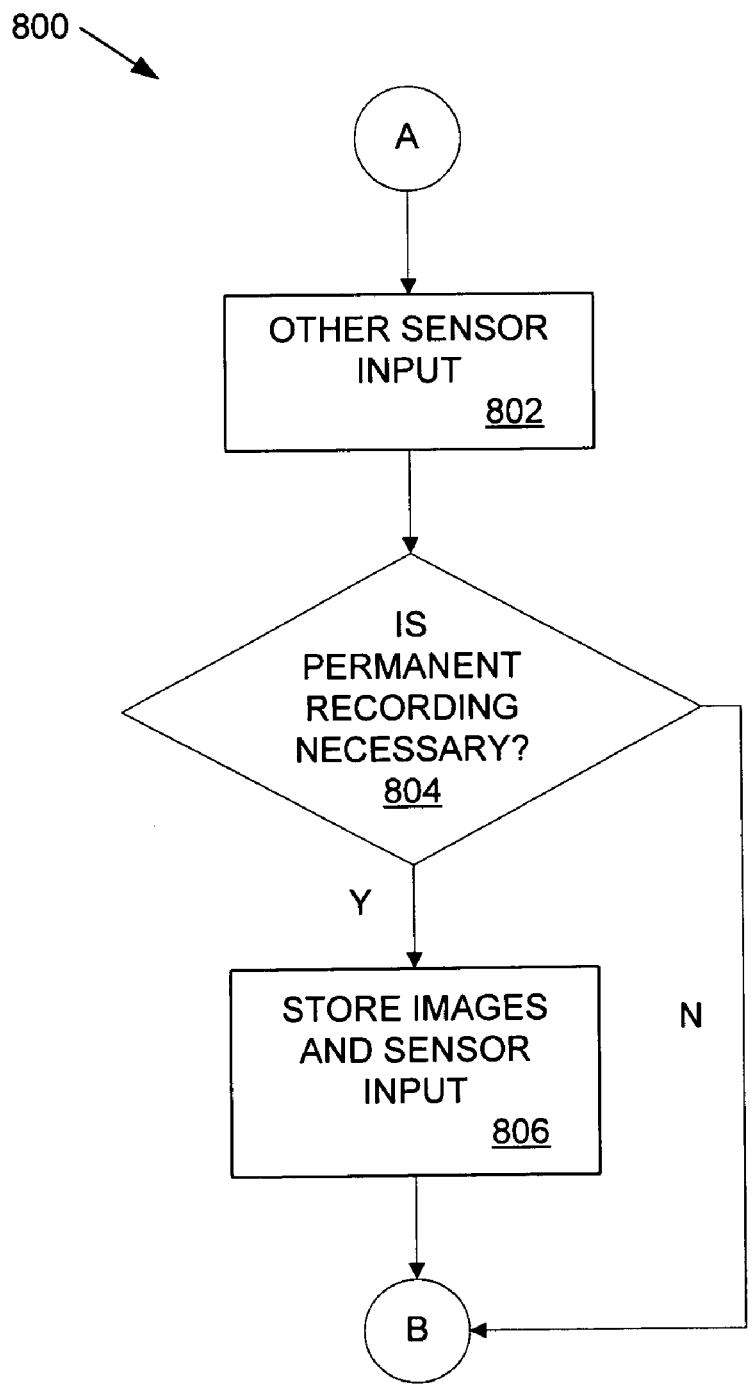
FIG. 8 is a flowchart depicting an exemplary method performed by the rear-end collision warning system for recording pre-crash and crash data.

In general instance sensor data may be discarded or overwritten to use as little memory space as possible in the computer processing unit 110. However, it is readily contemplated that the computer processing system 110 can persistently save a history of sensor data before and during a rear-end collision, when an impact indeed occurs, for later retrieval. The recorded information can be used in various ways, such as for determining fault in an accident. FIG. 8 shows an exemplary flowchart of a process 800 for persistently storing crash related data, include data from before the collision. The process 800 may be independent of process 200 or incorporated in the process 200, one example of which is demonstrated in FIGS. 2 and 8, when a collision is imminent.

In either event, the process 800 commences when the computer processing system 110 receives sensor input from all the varieties of sensors 114 used. The computer processing system 110 then determines if recording is necessary based on whether the determined time to collision is within a range of predetermined or selectable values (step 804). If recording is not necessary, the process 800 terminates. If, however, the time to collision is within the range of values, the process 800 continues to step 806 wherein data from a predetermined range of time relevant to the collision is persistently stored. Simpler measures of collision risk, such as simple distance, may be used when the time to collision is not easily determined.

In other variations of the present disclosure, a rear-end collision warning system may be adapted to detect vehicles 150 that are within a blind spot of the driver 102 on either side of the lead vehicle 100. When a vehicle 150 is detected in such position by one or more sensors 114, the central processing system 110 may be programmed to transmit an audio or visual warning to the driver 102. In one example, the audible warning may be a sound broadcast from the speakers 106 resembling that of a passing car. The sound may, in various instances, be broadcast within the lead vehicle 100 by speakers 106 that are situated on the same side of the lead vehicle 100 as the detected second vehicle 150.

In still other variations of the present disclosure, occupants may be warned using tactile warnings, in addition to visual and/or audio alerts. Such tactile warnings may be provided by devices that generating a physical sensation that can be felt by the occupants, such as vibrating the seat of an occupant. Various additional tactile alerts may be incorporated in the systems described herein.

Although the best methodologies have been particularly described in the foregoing disclosure, it is to be understood that such descriptions have been provided for purposes of illustration only, and that other variations both in form and in detail can be made thereupon by those skilled in the art without departing from the spirit and scope thereof, which is defined first and foremost by the appended claims.

What is claimed is:

1. A method for generating a rear-end collision warning within a lead vehicle having at least one sensor, a computer processing system and an alerting device, the method comprising: detecting, using at least one sensor, a second vehicle approaching the lead vehicle from a rear direction; calculating, using the central processing system, a time to collision, based on at least one algorithm that determines a relative velocity of the second vehicle using a rate of change in current and previously stored data from the sensor and capability data of the second vehicle previously stored or received wireless from the second vehicle; and generating, using the alerting device, a rear-end collision warning to alert a driver of the lead vehicle of a possible rear-end collision, when the time to collision is within a predetermined range of values.

2. The method of claim 1, said calculating further comprising:
calculating an estimated severity of the collision based on the at least one algorithm using current and previously stored data from the sensor.

3. The method of claim 1, said generating further comprising: generating at least one of: a visual alert, an audio alert, and a tactile alert.

4. The method of claim 3, wherein the visual alert comprises flashing at least one light within a visible field of the driver.

5. The method of claim 4, wherein the visual alert comprises flashing at least one light within a visible field of the driver at a variable rate based on the time to collision.

6. The method of claim 3, wherein the visual alert comprises displaying, to the driver, at least one of: a distance of the second vehicle, the time to collision with the second vehicle and an estimated severity of the collision.

7. The method of claim 3, wherein the audio alert comprises transmitting a sound through a speaker that is audible to the driver.

8. The method of claim 3, wherein the tactile alert comprises generating a sensation that can be felt by the driver.

9. The method of claim 1, said detecting further comprising:
detecting the second vehicle using at least one camera.

10. The method of claim 1, said detecting further comprising
detecting the second vehicle using at least one of: a radar and a lidar.

11. The method of claim 1, further comprising:
activating a safety apparatus of the lead vehicle based on the time to collision.

12. The method of claim 1, further comprising:
generating a visual alert to a driver of the second vehicle.

13. The method of claim 12, said generating the visual alert to the driver of the second vehicle further comprising:
flashing a brake light of the lead vehicle at a rate that changes based on the time to collision.

14. The method of claim 12, said generating the visual alert to the driver of the second vehicle further comprising:
flashing an array of multi-color lights mounted on the lead vehicle facing the rear direction at a rate that is based on at least one of: the time to collision and an estimated severity of the collision.

15. The method of claim 14, further comprising:
receiving a selection of a pattern for the array of multi-color lights; and
flashing the array of multi-color lights according to the pattern.

16. The method of claim 1, further comprising:
transmitting, to the second vehicle, a signal indicating a possible collision based on the time to collision between the first vehicle and the second vehicle, whereby the second vehicle uses the signal to activate at least one of:
a driver alerting device of the second vehicle, a braking system of the second vehicle, and
a safety device of the second vehicle.

17. The method of claim 1, further comprising:
generating a noise that is audible to a driver of the second vehicle based on the time to collision.

18. The method of claim 1, wherein the vehicle capability data further comprising comprises one of either: vehicle capability data of the second vehicle received from the second vehicle or programmed information about various motor vehicles, wherein said at least one algorithm determines the time to collision using the vehicle capability data.

19. The method of claim 18, further comprising: flashing an array of multi-color lights mounted on the lead vehicle facing the rear direction; and adjusting an angle of the array of multi-color lights based on the vehicle capability data and a distance of the second vehicle determined using data from the at least one sensor.

20. The method of claim 1, further comprising:
receiving sensor data from the at least one sensor, the sensor data comprising at least one of: temperature of the road surface, road surface conditions, precipitation conditions; and
said calculating further comprising:
calculating, based on the sensor data, at least one of the time to collision and an estimated severity of the collision.

21. The method of claim 1, further comprising:
permanently storing sensor data regarding the second vehicle approaching the lead vehicle for retrieval after a collision of the second vehicle and the lead vehicle.

22. A method for generating a rear-end collision warning within a lead vehicle having at least one sensor, a computer processing system and at least one alerting device, the method comprising: detecting, using the at least one sensor, a second vehicle approaching the lead vehicle from a rear direction; calculating, using the central processing system, at least one of a time to collision and an estimated severity of collision, based on at least one algorithm that determines a relative velocity of the second vehicle using a rate of change in current and previously stored data from the sensor; and vehicle capability data of the second vehicle previously stored or received wireless from the second vehicle; and
generating, using a first alerting device, a rear-end collision warning to alert a driver of the lead vehicle of a possible rear-end collision, when the time to collision is within a predetermined range of values; and generating, using a second alerting device, a second rear-end collision warning to alert a driver of the second vehicle of the possible rear-end collision, when the time to collision is within a second predetermined range of values.

23. The method of claim 22, wherein the first predetermined range of values equals the second predetermined range of values.

24. The method of claim 22, said generating the second rear-end collision warning further comprising:
flashing at least one of a brake light, a reverse light, and an array of rear-facing lights of the lead vehicle.

25. The method of claim 24, said flashing further comprising:
flashing at least one of the brake light, the reverse light, and the array of rear-facing lights at a variable rate that is based on the time to collision.

26. The method of claim 25, wherein the variable rate may be adjusted manually.

27. A method for generating a rear-end collision warning within a lead vehicle having at least one sensor, an antenna, a computer processing system and at least one alerting device, the method comprising: detecting, using the at least one sensor, a second vehicle approaching the lead vehicle from a rear direction; receiving, using the antenna, vehicle capability information from the second vehicle; calculating, using the central processing system, a time to collision, based on the vehicle capability information and at least one algorithm that determines the velocity of the second vehicle using a rate of change in current and previously stored data from the sensor; and generating, using a first alerting device, a rear-end collision warning to alert a driver of the lead vehicle of a possible rear-end collision, when the time to collision is within a range of values determined from the vehicle capability information.

28. The method of claim 27, further comprising: receiving, from the second vehicle using the at least one sensor, vehicle capability data of the second vehicle, wherein said at least one algorithm determines the time to collision based on the vehicle capability data.

29. A method for generating a rear-end collision warning within a lead vehicle having at least one sensor, a computer processing system and an alerting device, the method comprising: detecting, using at least one sensor, a second vehicle approaching the lead vehicle from a rear direction; receiving, from the second vehicle using the at least one sensor, vehicle capability data of the second vehicle, wherein said-at least one algorithm determines the time to collision using the vehicle capability data; calculating, using the central processing system, a time to collision, based on at least one algorithm that determines a relative velocity of the second vehicle using data from the sensor; and generating, using the alerting device, a rear-end collision warning to alert a driver of the lead vehicle of a possible rear-end collision, when the time to collision is within a predetermined range of values wherein the warning consists of a flashing an array of multi-color lights mounted on the lead vehicle facing the rear direction; and adjusting an angle of the array of multi-color lights based on the vehicle capability data and a distance of the second vehicle determined using data from the at least one sensor.

* * * * *